(No Model.) 3 Sheets—Sheet 1.
R. H. PIERCE.
RAIL JOINT.
No. 552,775. Patented Jan. 7, 1896.
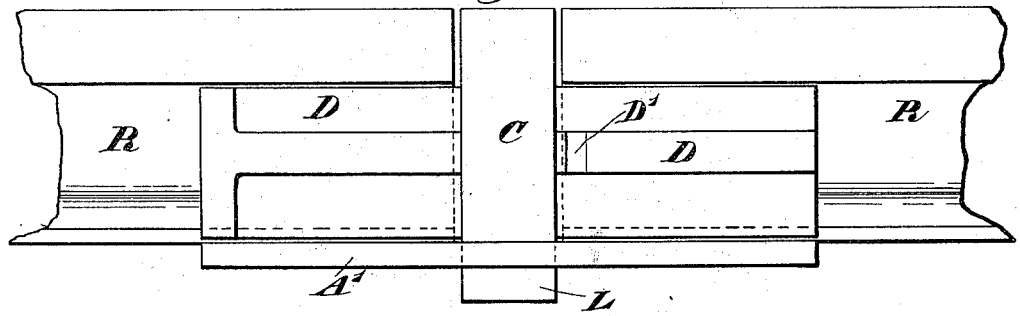
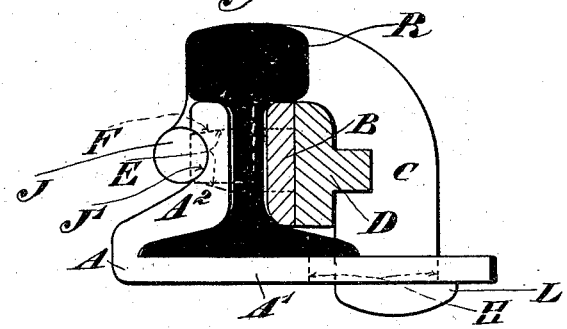
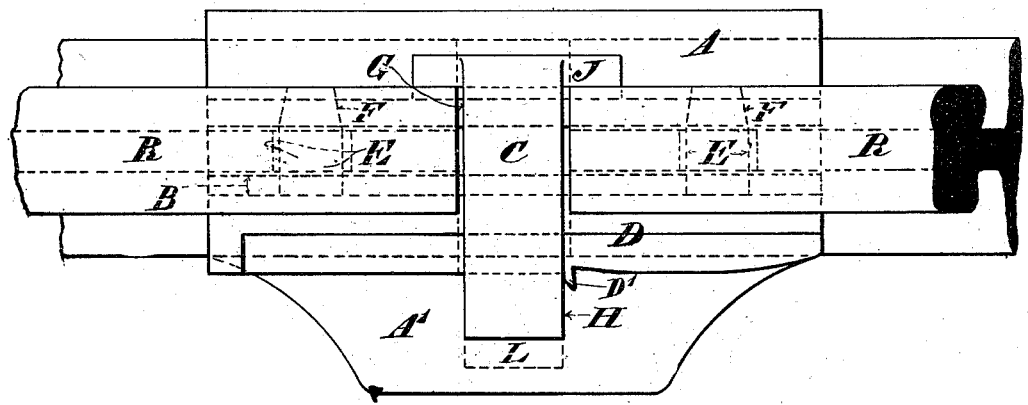
Witnesses.
Inventor.

(No Model.) 3 Sheets—Sheet 2.
R. H. PIERCE.
RAIL JOINT.
No. 552,775. Patented Jan. 7, 1896.
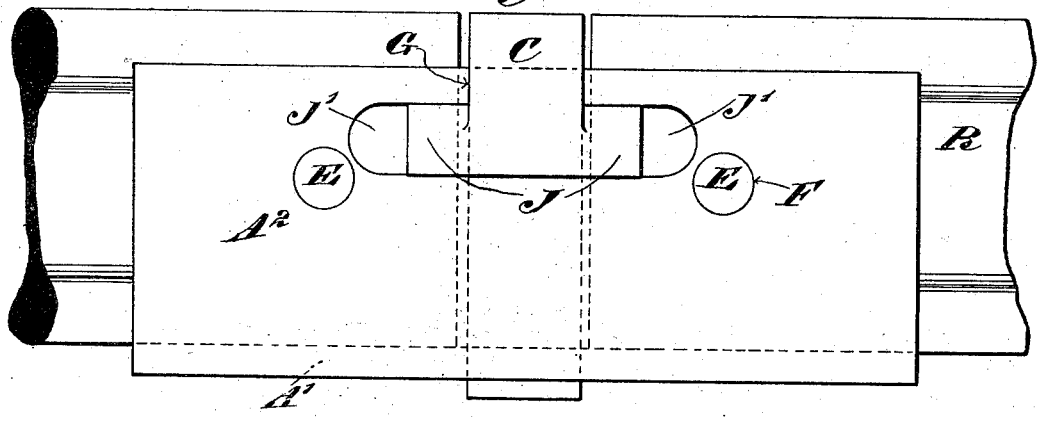
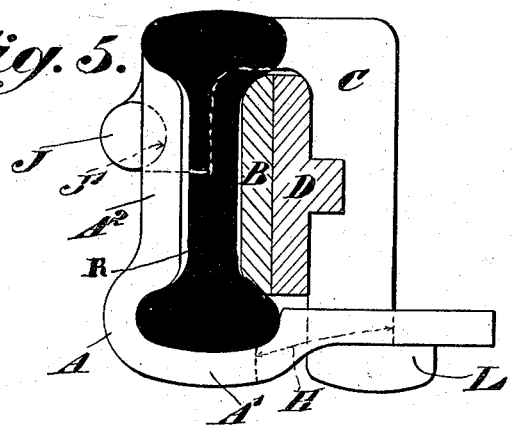
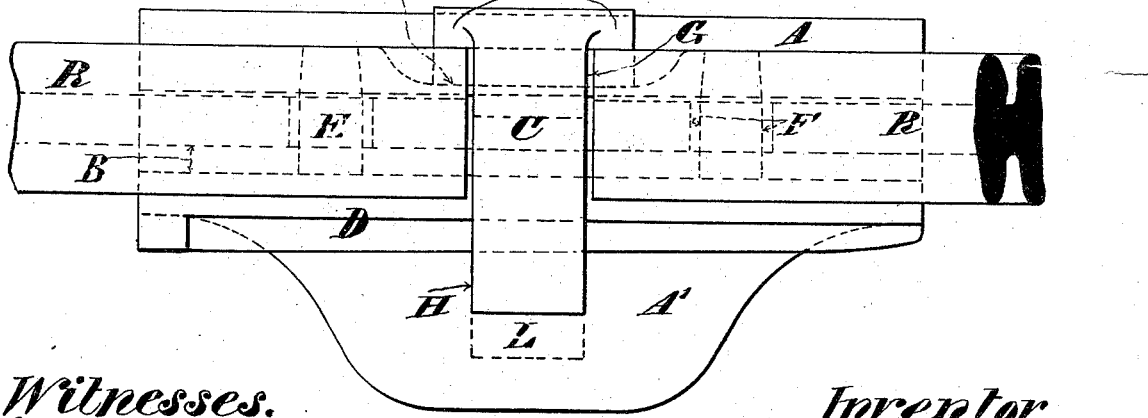
Witnesses. Inventor.

(No Model.) 3 Sheets—Sheet 3.

R. H. PIERCE.
RAIL JOINT.

No. 552,775. Patented Jan. 7, 1896.

Witnesses. Inventor.

UNITED STATES PATENT OFFICE.

REGINALD HENRY PIERCE, OF ABU ROAD, INDIA.

RAIL-JOINT.

SPECIFICATION forming part of Letters Patent No. 552,775, dated January 7, 1896.

Application filed April 29, 1895. Serial No. 547,596. (No model.)

*To all whom it may concern:*

Be it known that I, REGINALD HENRY PIERCE, a subject of the Queen of Great Britain and Ireland, residing at Abu Road, in the Province of Rajpootana, India, have invented Improvements in Rail-Joints, of which the following is a specification.

As is well known, much trouble is caused with the ordinary fish-plates by which the rails of permanent ways are joined together, owing to the working loose of the bolts and nuts by which they are secured, and the various devices that have been proposed for preventing the nuts from becoming slack have only partially obviated this trouble. Not only so, but such fish-plates are weak and constitute the chief cause of "sunk joints," resulting in bad roads and greater wear and tear of rolling-stock, and which require extra labor to maintain in an efficient condition. Furthermore, the fish-plates are liable to breakage, as are also, to a greater extent, the bolts and nuts used to secure them.

Now this invention has reference to the construction of a simple and reliable rail-joint without the use of bolts and nuts.

In order that the nature of this invention may be clearly understood, I will proceed to describe the same with the aid of the accompanying drawings, in which—

Figure 7:
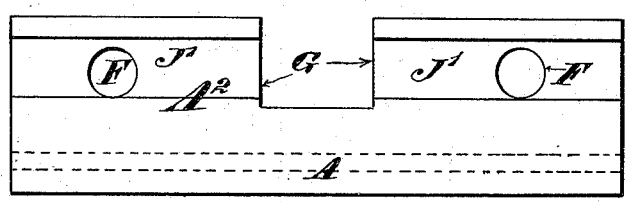
Figure 9:
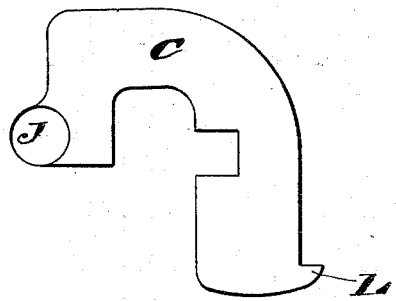
Figure 10:
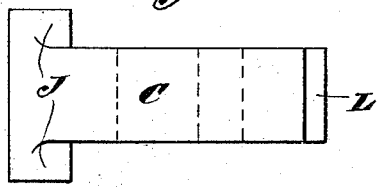

Figures 1, 2 and 3 and Figs. 4, 5 and 6 show my improved joint as applied, respectively, to flat-bottom or Vignole rails and to double-headed rails of large section, Figs. 1 and 4 being elevations as seen from outside and inside the track respectively, Figs. 2 and 5 cross-sections, and Figs. 3 and 6 plans of the joints. Fig. 7 shows separately in side elevation and Fig. 8 in plan a chair forming part of the joint illustrated in Figs. 1 to 3; and Figs. 9 and 10 show, respectively, in side elevation and in plan a connecting-piece hereinafter more fully described.

Figure 8:
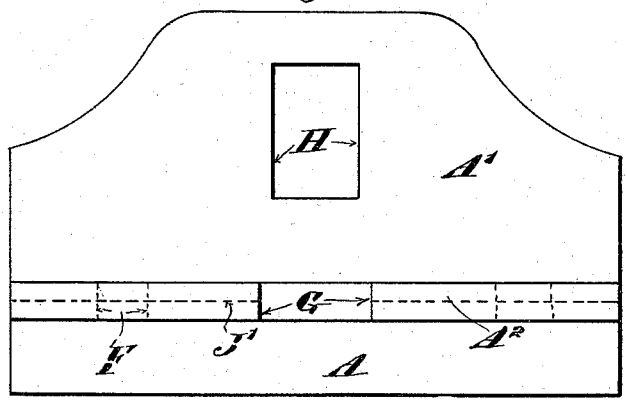

A A' A² is a chair, of which the part A' when in position fits close to the feet of the rails R to be jointed, beyond which it projects and is provided with a rectangular hole H, Fig. 8, while the other part A² is turned upward and suitably pressed or molded to form the inner fish-plate. (See Figs. 2 and 5.) The part A² is provided with a gap G in the middle and with two taper holes F, Fig. 7, corresponding to but smaller than those of the usual fish-bolt holes punched in the rail ends R.

B is an ordinary fish-plate, which is of the same length as the chair and has two holes corresponding to but larger than the holes F.

According to this invention the ends of the rails are not brought near together, as is the case when using ordinary fish-plates, but a considerable space, varying according to circumstances, is left between them. The object of this space is to allow of the insertion of a connecting-piece C, by means of which the whole joint is secured or bound together. The width of this connecting-piece, and consequently the amount of space between the rail ends, is determined by the amount of strength necessary for any particular rail-joint. The width of the piece C determines also the size of the gap G in the part A², as the piece C must fit into this gap easily but closely. The said connecting-piece is made of the shape clearly shown in Figs. 9 and 10, and is provided with two lugs J, which fit into grooves or recesses J' formed on the outside of the part A² of the chair, and with a shoulder L which passes through the hole H and catches the under side of the part A'. Its function is twofold—it forms the medium through which the force is applied which binds the inner and outer fish-plates A² and B tightly against the rail ends R, and it partly fills up the space between the rail ends, so that the rolling-stock can pass over the joint without jars.

D is a wedge, which is of about the same length as the chair A and is made with a slight taper and preferably of T-section, as shown.

E E are two studs of suitable shape in cross-section, preferably round, as illustrated. They are made with taper points and of such a diameter as to loosely fit the holes in the rail ends and in the part A² and fish-plate B. The function of these studs is to prevent "creep" of the rails, by which the latter might be moved apart.

In making a rail-joint according to this invention the chair A A' A² is first brought into position, the part A² being arranged on the inner side of the rail ends R. The fish-plate B is then placed in position on the outer side of the rail ends, and the studs E are driven through it and the holes in the rail ends until their taper points fit into the holes F in part A, which holes, as hereinbefore explained, are made rather smaller than those in the fish-plate B, so that the said studs cannot work through them. The connecting-piece C is now fitted in place so that its lugs J engage in the grooves or recesses J' in the outer side of the part A², and the shoulder L passes through the hole H and catches the under side of the part A'. There is now a space left between the fish-plate B and the piece C, which is filled up and the joint completed by driving in the wedge D. The wedge, it will be observed, covers the holes in the fish-plate B through which the studs E have been driven, so that until it is removed there is no possibility of the pins coming out. As there is a comparatively small amount of taper in the wedge D it can be driven in very tightly, and it is almost impossible for it to become loose unless driven out with a hammer. As a further protection against the wedge D working loose through vibrations it may, after being driven home, be slightly cut or indented at D', Fig. 1, with a chisel, and the metal slightly turned up against the piece C. This will make it impossible for the wedge to work loose by vibrations caused by the rolling-stock.

What I claim is—

1. A rail joint comprising a chair, fish-plates adapted to bear at opposite sides of the rail ends to be jointed, a connecting piece adapted to engage one of said fish plates and also said chair, and means for forcing apart the other fish plate and said connecting piece substantially as herein described.

2. A rail joint comprising a chair, fish-plates adapted to bear at opposite sides of the rail ends to be jointed, locking pins adapted to pass transversely through the rail ends and into said fish plates, a transverse connecting piece adapted to engage one of said fish plates and also said chair, and means for forcing apart the other fish-plate and said connecting piece and serving also to hold said locking pins in place, substantially as herein described for the purpose specified.

3. A rail-joint comprising a chair provided with a cheek adapted to serve as a fish-plate at one side of the rail ends to be jointed, a separate fish-plate for the opposite side of said rail ends, a connecting piece extending transversely between said rail ends, and adapted to engage the cheek and base portions of said chair, and means for forcing apart said connecting piece and said separate fish-plate, substantially as herein described for the purpose specified.

4. A rail-joint comprising a chair provided with a cheek adapted to serve as a fish-plate, a separate fish-plate, a connecting piece adapted to nearly fill up the space between the ends of the rails to be joined and to engage said cheek and the base of said chair, and means for forcing apart said connecting piece and separate fish-plate, substantially as and for the purposes herein set forth.

5. A rail joint comprising a chair provided with a cheek furnished with holes and adapted to serve as a fish-plate, a separate fish-plate provided with holes, pins adapted to pass through the holes in the said separate fish-plates, and through the rail ends to be joined and to enter the holes in said cheek, a connecting piece adapted to engage said chair, and a wedge adapted to force apart said connecting piece and separate fish plate, substantially as herein set forth for the purpose specified.

6. A rail joint comprising a chair provided with a cheek adapted to serve as a fish-plate, a separate perforated fish-plate, a transverse connecting piece, and means for forcing apart the said separate fish-plate and the said connecting piece, said chair having a gap G, holes F, recesses J' and a hole H, and said connecting piece being provided with lugs J adapted to engage in the said recesses J' and with a shoulder L adapted to pass through the said hole H and to catch the under side of the said chair, substantially as herein set forth.

In testimony whereof I have signed my name to this specification in the presence of two subscribing witnesses.

REGINALD HENRY PIERCE.

Witnesses:
  C. H. MACHIE,
  A. OSBOURNE.